(12) United States Patent
Xue

(10) Patent No.: US 9,600,559 B2
(45) Date of Patent: Mar. 21, 2017

(54) DATA PROCESSING FOR DATABASE AGGREGATION OPERATION

(71) Applicant: International Business Machines Corporation, Armonk, NY (US)

(72) Inventor: Yi Xue, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 13/947,405

(22) Filed: Jul. 22, 2013

(65) Prior Publication Data

US 2014/0052727 A1    Feb. 20, 2014

(30) Foreign Application Priority Data

Jul. 31, 2012    (CN) .......................... 2012 1 0270516

(51) Int. Cl.
   *G06F 17/30*    (2006.01)

(52) U.S. Cl.
   CPC .............................. *G06F 17/30598* (2013.01)

(58) Field of Classification Search
   USPC ........................................................ 707/737
   See application file for complete search history.

(56) References Cited

U.S. PATENT DOCUMENTS

| 7,555,473 | B2 | 6/2009 | Larson et al. |
| 7,593,926 | B2 | 9/2009 | Larson et al. |
| 2003/0208506 | A1* | 11/2003 | Greenfield et al. ........... 707/102 |

FOREIGN PATENT DOCUMENTS

| CN | 1783077 A | 6/2006 |
| CN | 102054001 A | 5/2011 |
| CN | 102375852 A | 3/2012 |
| CN | 102521374 A | 6/2012 |

OTHER PUBLICATIONS

Zhewei Wei, et al: "Beyond Simple Aggregates: Indexing for Summary Queries"; PODS'11; Jun. 13-15, 2011, Athens, Greece; pp. 12.

* cited by examiner

*Primary Examiner* — Hung T Vy
(74) *Attorney, Agent, or Firm* — Cantor Colburn LLP

(57) ABSTRACT

Embodiments relate to a method, system, and computer program product for database aggregation operations. The method includes acquiring data located in data pages of extents and performing a database aggregation operation pre-processing on the acquired data. The method also includes storing the result of said pre-processing in summary data pages, the summary data pages being used for performing database aggregation operations rapidly.

11 Claims, 7 Drawing Sheets

CREATE TABLE SALES
(SALEID INTEGER NOT NULL,
SALEPERSON STRING,
DAY INTEGER,
MONTH INTEGER,
YEAR INTEGER,
AMOUNT DECIMAL(10,2),
QUANTITY INTEGER,
PRODUCT STRING,
CATEGORY STRING);

FIG. 4A

| SALEID | SALEPERSON | DAY | MONTH | YEAR | AMOUNT | QUANTITY | PRODUCT | CATEGORY |
|---|---|---|---|---|---|---|---|---|
| . . . . | . . . . . | | 1 | 2012 | 30 | 50 | . . . . . | FOOD |
| . . . . | . . . . . | . . . | . . . . . | . . . . . | . . . . . | . . . . . | . . . . . | . . . . . |
| . . . . | . . . . . | | 2 | 2012 | 2030 | 70 | . . . . . | DIGITAL |
| . . . . | . . . . . | . . . | . . . . . | . . . . . | . . . . . | . . . . . | . . . . . | . . . . . |
| . . . . | . . . . . | | 3 | 2012 | 260 | 82 | . . . . . | SHOE |
| . . . . | . . . . . | . . . | . . . . . | . . . . . | . . . . . | . . . . . | . . . . . | . . . . . |
| . . . . | . . . . . | | 4 | 2012 | 70 | 45 | . . . . . | OTHER |
| . . . . | . . . . . | . . . | . . . . . | . . . . . | . . . . . | . . . . . | . . . . . | . . . . . |
| . . . . | . . . . . | | 5 | 2012 | 82 | 65 | . . . . . | OTHER |
| . . . . | . . . . . | . . . | . . . . . | . . . . . | . . . . . | . . . . . | . . . . . | . . . . . |
| . . . . | . . . . . | | 6 | 2012 | 350 | 120 | . . . . . | APPAREL |
| . . . . | . . . . . | . . . | . . . . . | . . . . . | . . . . . | . . . . . | . . . . . | . . . . . |

FIG. 4B

CREATE INDEX IDX_SALE ON SALES
(YEAR,
MONTH,
CATEGORY);

|        | AMOUNT |       |     |     |       | QUANTITY |      |     |     |
|--------|--------|-------|-----|-----|-------|----------|------|-----|-----|
|        | Row #  | SUM   | MAX | MIN |       | Row #    | SUM  | MAX | MIN |
| EXT    | 135    | 26710 | 350 | 143 | EXT   | 135      | 3518 | 339 | 2   |
| PAGE1  | 10     | 5000  | 350 | 230 | PAGE1 | 10       | 840  | 300 | 2   |
| PAGE2  | 30     | 6530  | 200 | 210 | PAGE2 | 30       | 750  | 275 | 10  |
| PAGE3  | 27     | 6230  | 264 | 243 | PAGE3 | 27       | 773  | 289 | 7   |
| PAGE4  | 25     | 3230  | 214 | 143 | PAGE4 | 25       | 473  | 339 | 56  |
| PAGE5  | 43     | 5720  | 278 | 267 | PAGE5 | 43       | 682  | 254 | 28  |
| Key1   | 38     | 8432  | 278 | 210 | Key1  | 62       | 1910 | 339 | 7   |
| Key2   | 52     | 9864  | 350 | 230 | Key2  | 39       | 870  | 289 | 10  |
| Key3   | 45     | 8414  | 214 | 143 | Key3  | 34       | 738  | 300 | 2   |

FIG. 4E

| FOOD    | 36578   | 60   | 10  | 30   |
|---------|---------|------|-----|------|
| APPAREL | 128932  | 600  | 50  | 300  |
| SHOE    | 64792   | 450  | 35  | 120  |
| DIGITAL | 1357892 | 3000 | 150 | 1600 |
| OTHER   | 20000   | 375  | 20  | 60   |

FIG. 4F

DATA PROCESSING FOR DATABASE AGGREGATION OPERATION

PRIORITY

The present application claims priority to Chinese Patent Application number 201210270516.9 filed Jul. 31, 2012 and all benefits accruing therefrom under U.S.C. §119, the contents of which is incorporated herein by reference in its entirety.

BACKGROUND

The present disclosure relates generally to data processing, and more specifically to data processing relating to database aggregation operations.

With the advent of technology, data processing is becoming increasingly important as it has become widely used in various industries such as information management, statistics, business, and finance. Database technology is a fundamental part of data processing especially in supporting information storage and management. Database management is challenging, however, as there has been a constant increase in amount of stored data or applications associated with data warehousing. One particular challenge is in performing aggregation operations on massive amount of data, particularly those that are labeled as historical data.

Aggregation operation is a basic operation of the data warehousing applications and is used in a variety of manners such as to perform statistical operations, reporting requests and even data mining. Some common types of aggregation operations include SUM, AVG, MAX, MIN, COUNT, and other similar important and basic functions that are used on a daily basis. For example, a certain bank needs to count the number of transactions relating to individual funds where the transaction amount exceeds 30,000 dollars. The query relates to all such transactions in the past 3 years. The inquiry can be further expanded to relate to both the maximum transaction amount and/or to the average transaction amount. Traditionally, to handle such a request a common processing method involves generating a query statement and then scanning all the rows of a database matrix in order to satisfy the requirement relating to data stored in the historical data bank relating to the past 3 years. Then the maximum value and average value are calculated thereof to satisfy the expanded inquiry conditions. Since the number of transactions of a bank is extremely large, the amount of stored historical data is necessarily quite large. Consequently, the amount of time and resources that need to be allocated to the task is substantial. Not only does it take a long time to run the data query on the large amount of existing records and to extricate the ones that satisfy the condition from the massive historical data bank, but specified requested calculations need to be performed as well which adds to the time and effort to complete the task. These types of tasks can consume anywhere between several hours to several weeks to complete depending on the amount of data in storage.

Some tools such as multi-dimension database (MDDB) can be used to help alleviate the above mentioned issues. MDDB has some advantages as compared to relational databases. For example in an MDDB when it is known that the key value combinations of data columns will be accessed in a relatively uniform manner, it is possible to improve the data processing speed and response time by improving the query efficiency. However, there are tradeoffs when using MDDB. For example, one disadvantage of the MDDB is that it needs to store all possible combinations to cover all data records to which the query statement is possibly related. The storage requirement for accomplishing this task can be both tremendous and costly. Therefore, this tradeoff in many instances does not seem worth. This is because the instances where the number of times (or the probability) where key value combinations need to be accessed in a uniform manner seldom occur.

Another possible solution for reducing query time involves calculating certain functions beforehand. This is only useful with respect to a predefined particular query statement. However, the instances where such a condition presents itself is not frequent and the improvements are not large. In addition, the one obvious disadvantage of this solution is that the improvement only occurs in instances where the operations or calculation can be performed beforehand and with respect to a predefined particular query statement. This solution cannot be performed with respect to a variety of random query statements, especially those that require data statistics, analysis and mining. In addition, it is difficult to predict or predefine all particular query statements for an operation beforehand.

BRIEF SUMMARY

Embodiments include a method, system, and computer program product for database aggregation operations. The method includes acquiring data located in data pages of extents and performing a database aggregation operation pre-processing on the acquired data. The method also includes storing the result of said pre-processing in summary data pages, the summary data pages being used for performing database aggregation operations rapidly.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIGS. 4A, 4B, 4C, 4D, 4E, and 4F depict next stages of performing pre-processing operation on data involved during completion of a database aggregation operation in accordance with one embodiment.

DETAILED DESCRIPTION

Figure 1:
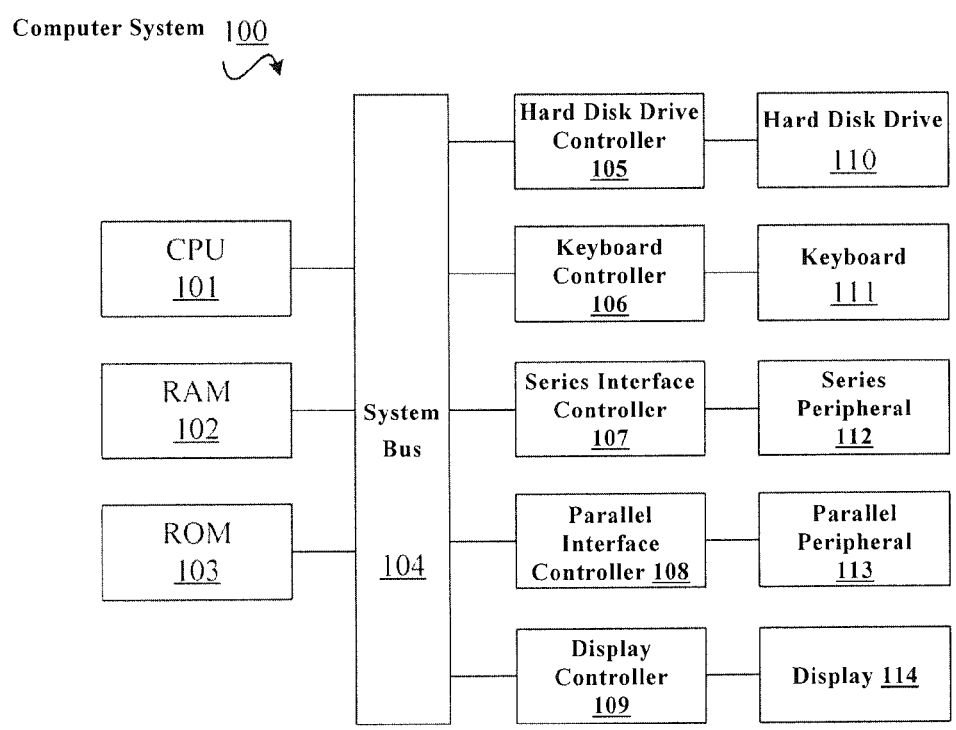
FIG. 1 depicts a block diagram of an exemplary computer system in accordance with one embodiment.

Hereinafter, a data processing method and system for database aggregation operations provided by the present invention will be described in detail through embodiments with reference to accompanying drawings.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 provides an illustration of a block diagram of an exemplary computer system 100 used in conjunction with one embodiment of the present invention. As shown in FIG. 1, the computer system 100 may include one or more Central Process Units (CPU) 101, a random access memory (RAM) 102, a read only memory(ROM) 103, System Bus 104, Hard Disk Drive Controller 105, Keyboard Controller 106, Serial Interface Controller 107, Parallel Interface Controller 108, Display Controller 109, Hard Disk Drive 110, Keyboard 111, Serial Peripheral Equipment 112, Parallel Peripheral Equipment 113 and Display 114. Among these devices, CPU 101, RAM 102, ROM 103, Hard Disk Drive Controller 105, Keyboard Controller 106, Serial Interface Controller 107, Parallel Interface Controller 108 and Display Controller 109 are coupled to the System Bus 104. Hard Disk Drive 110 is coupled to Hard Disk Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

Figure 2:
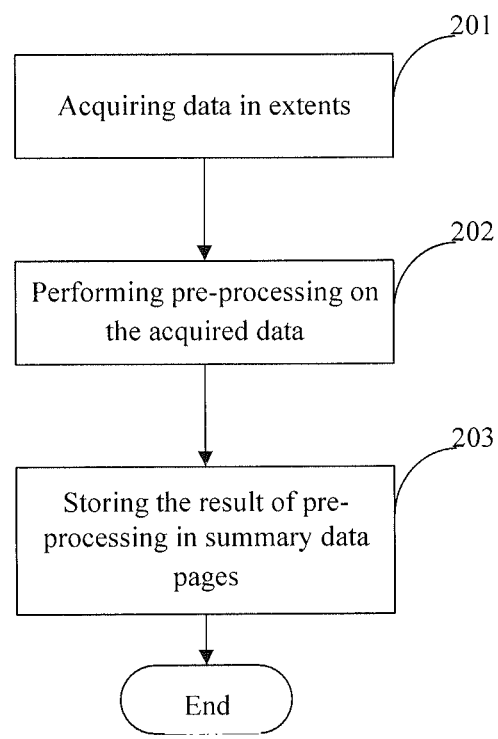
FIG. 2 is a flowchart illustration for processing database aggregation operations in accordance with one embodiment.

FIG. 2 is a flowchart depiction of a data processing method for database aggregation operations according to one embodiment of the present invention. The method shown in FIG. 2 starts with step 201 where data in normal data pages of extents are acquired. The "Extent" is a continuous interval with a fixed-length (capacity), and is a basic data storage unit in a database. Each "extent" includes a number of data pages in which data are stored. The "normal data page" in step 201 can be understood as a conventional data page that stores data. It is called the "normal data page" in order to be distinguished from a "summary data page" (hereinafter, it will be described in detail) in the subsequent steps. The "normal data page" and the "summary data page" constitute a universal [maybe "universal" here?]set of data pages in the extent. Except the "normal data page" and the "summary data page", no other types of data pages exist in the extent. According to one embodiment of the present invention, data acquired in step 201 are from extents that have been stored in a data warehouse or database. According to another embodiment of the present invention, data acquired in step 201 are data in normal data pages that are currently to be stored in extents.

In step 202 database aggregation operation pre-processing is performed on the acquired data. According to one embodiment of the present invention, the type of the "database aggregation operation" in the present invention includes, but not limited to, the following operations performed on data in the database: SUM, MAX, MIN, AVG. Those skilled in the art should understand that any other types of operation belong to the "database aggregation operation", as long as it is related to performing a calculation, a counting with respect to data of uncertain "rows" based on a certain or some certain data columns. In the case of considering massive historical data, if data "rows" that satisfy the requirement are read one by one when a real-time database aggregation operation request is received, the run time will be greatly consumed. Therefore, some intermediate results that may be directly used are prepared beforehand by performing database aggregation operation pre-processing on data acquired in step 201, so that when a real-time database aggregation operation request is being fulfilled, a large number of data "rows" may be skipped. Here, the "database aggregation operation pre-processing" means the pre-processing is for a database aggregation operation. For example, for some data "columns" of the string type, these data "columns" are not possible to be used for a database aggregation operation, so pre-processing is not necessarily to be performed on these data "columns" when the pre-processing is performed. Of course, in addition to the consideration of data types, there may also be other considerations. For example, though certain columns in original data are of the integer type or the floating point type and the database aggregation operation pre-processing may be performed on them theoretically, but because in fact these columns seldom act as operation objects of database aggregation operations, these columns are excluded when the database aggregation operation pre-processing is performed.

In step 202, the database aggregation operation pre-processing performed on the acquired data is within the ranges of respective extents. That is, the pre-processing is performed on data within each extent so as to obtain the pre-processing result corresponding to the extent. A specific example is provided in conjunction with Table 1 for ease of understanding.

Table 1 shows a number of rows of data in a sales record table of a certain company. Suppose that the sales record table is stored in a certain extent but is distributed in a plurality of normal data pages in the extent. As can be seen from a number of rows of exemplary data, data columns "MONTH", "YEAR", "AMOUNT", "QUANTITY" are data of the integer type.

TABLE 1

| SALEID | SALEPERSON | DAY | MONTH | YEAR | AMOUNT | QUANTITY | PRODUCT | CATEGORY |
|---|---|---|---|---|---|---|---|---|
| ... | ... |  | 1 | 2012 | 30 | 50 | ... | FOOD |
| ... | ... | ... | ... | ... | ... | ... | ... | ... |
| ... | ... |  | 2 | 2012 | 2030 | 70 | ... | DIGITAL |
| ... | ... | ... | ... | ... | ... | ... | ... | ... |
| ... | ... |  | 3 | 2012 | 260 | 82 | ... | SHOE |
| ... | ... | ... | ... | ... | ... | ... | ... | ... |
| ... | ... |  | 4 | 2012 | 70 | 45 | ... | OTHER |
| ... | ... | ... | ... | ... | ... | ... | ... | ... |
| ... | ... |  | 5 | 2012 | 82 | 65 | ... | OTHER |
| ... | ... | ... | ... | ... | ... | ... | ... | ... |
| ... | ... |  | 6 | 2012 | 350 | 120 | ... | APPAREL |
| ... | ... | ... | ... | ... | ... | ... | ... | ... |

Table 2 shows an exemplary embodiment, depicting pre-processing result obtained according step 202. As can be seen from FIG. 2, the pre-processing result is obtained based on two data columns "AMOUNT" and "QUANTITY" in Table 1, and the pre-processing result is still embodied in the form of "table". The pre-processing result table includes a total of 10 columns wherein 5 columns on the left correspond to the pre-processing result with respect to the data column "AMOUNT" in Table 1 and 5 columns on the right correspond to the pre-processing result with respect to the data column "QUANTITY" in Table 1. The 5 columns on the left and the 5 columns on the right have the same number of columns and the same column names. The leftmost column "EXTENT" means that the pre-processing result is the pre-processing result of the whole extent, the second column "ROW#" indicates the total number of data rows in the extent, the third column "SUM" indicates results of summing values of two columns "AMOUNT" and "QUANTITY" of data in all the 135 data rows. That is, the sum of "AMOUNT" values of data of all the 135 rows in Table 1 is 26710, and the sum of "QUANTITY" values is 3518. In the same way, those skilled in the art should understand the meanings of columns "MAX" and "MIN" in Table 2 and the meanings of specific values of these two columns.

|  | AMOUNT | | | | QUANTITY | | | |
| --- | --- | --- | --- | --- | --- | --- | --- | --- |
|  | Row # | SUM | MAX | MIN |  | Row # | SUM | MAX | MIN |
| EXTENT | 135 | 26710 | 350 | 143 | EXTENT | 135 | 3518 | 339 | 2 |

As can be seen from Table 2, once the pre-processing result in Table 2 has been obtained, once a summing request for "AMOUNT" or "QUANTITY" column in Table 1 is received in real time, the pre-processing result in Table 2 may be directly utilized to directly obtain 26710 which is the sum of "AMOUNT" and 3518 which is the sum of "QUANTITY", without reading data in Table 1 row by row and adding up these data one by one. It is noted that, this example supposes the summing request is exactly made for only one extent. However, those skilled in the art should understand that it is only a supposition for convenience of illustration, and a real database aggregation operation request may requires to access data in a plurality of extents.

Table 2 is provided merely as an example to aid clarity with the understanding that those skilled in the art appreciate the fact that alternate embodiments can be provided. Therefore, Table 2 should not be considered to place any limitation on the pre-processing operation in step 202. In fact, in one alternate embodiment, the pre-processing may be performed on all the columns of the integer type in Table 1, or may also be performed on only one column in Table 1. In addition, the pre-processing result in Table 2 may comprise only one column of "SUM", or may also comprise other columns than columns shown in current Table 2, e.g., "SQUARE", "AVG" etc. It should also be noted that the example in Table 2 gives only one row of pre-processing result, i.e., the pre-processing result based on the "extent" level. Again, this is only provided to aid understanding and therefore in other embodiments, it is possible to perform pre-processing on each data page or even each specific key value in the extent. That is, the level (granularity) of pre-processing is arbitrarily adjustable. This part of content will be further described in FIGS. 3 and 4 and their corresponding descriptions.

Furthermore, the Tables 1 and 2 are based on one precondition that all the data rows in Table 1 are stored in one extent. However, this precondition is only for the convenience of illustration and provided as an example. As can be appreciated by those skilled in the art, this is not a necessary precondition for implementing the present invention. Even if data in Table 1 is stored in a plurality of extents due to an excessive amount of data, it is possible to perform the pre-processing on data in each extent according to step 202, so that it is still possible to directly acquire the pre-processing result (Table 2) in the corresponding extent when real-time database aggregation operations are performed, so as to avoid reading data in Table 1 row by row and calculating these data.

Referring back to FIG. 2, in step 203 the pre-processing results are stored in summary data pages, said summary data pages being used for performing database aggregation operations rapidly. It should be noted that a "summary data page" is different from a "normal data page", but their difference only lies in the stored data content. Both of them are essentially data pages contained in an extent. According to one embodiment of the present invention, summary data pages and normal data pages are located in the same extent. Based on the embodiment, allocation of data pages in each extent may be set before storing data. For example, the first data page in each extent is a "summary data page" which is only used for storing pre-processing results in step 202 but not for storing other normal data. In this way, since data pages of the extent are set beforehand, pre-processing is performed in the course of storing data, and pre-processing results and other normal data of each extent are stored in the same extent. Summary data pages and normal data pages are located in different extents. For example, if historical data of the data warehouse has been stored in respective extents in a conventional way (without setting summary data pages), a number of new extents may be enabled to store summary data pages so as to store pre-processing results dedicatedly. Based on this embodiment, since a summary data page in which pre-processing results of an original extent is stored is located in another extent, according to one embodiment of the present invention, mapping information is added in the summary data page located in another extent so as to link the summary data page to the extent in which normal data pages are located. According to one embodiment of the present invention, mapping information may be embodied in the form of a header file. However, those skilled in the art may refer to and employ various methods of adding mapping information of the prior art.

The use of word "extent" can apply to the original extent or an index extent. An "original extent" means that the extent is used to store data in an original data table, whereas an "index extent" means that the extent is used to store index data after the original data table is indexed. Those skilled in the art should understand that an index is an object created on a database table or a view, the purpose of which is to improve the speed of querying the table or view. Intuitively, the index is a structure to order values of one or more columns in the database table. The use of the index may enable fast access to specific information in the database table.

Figure 3:
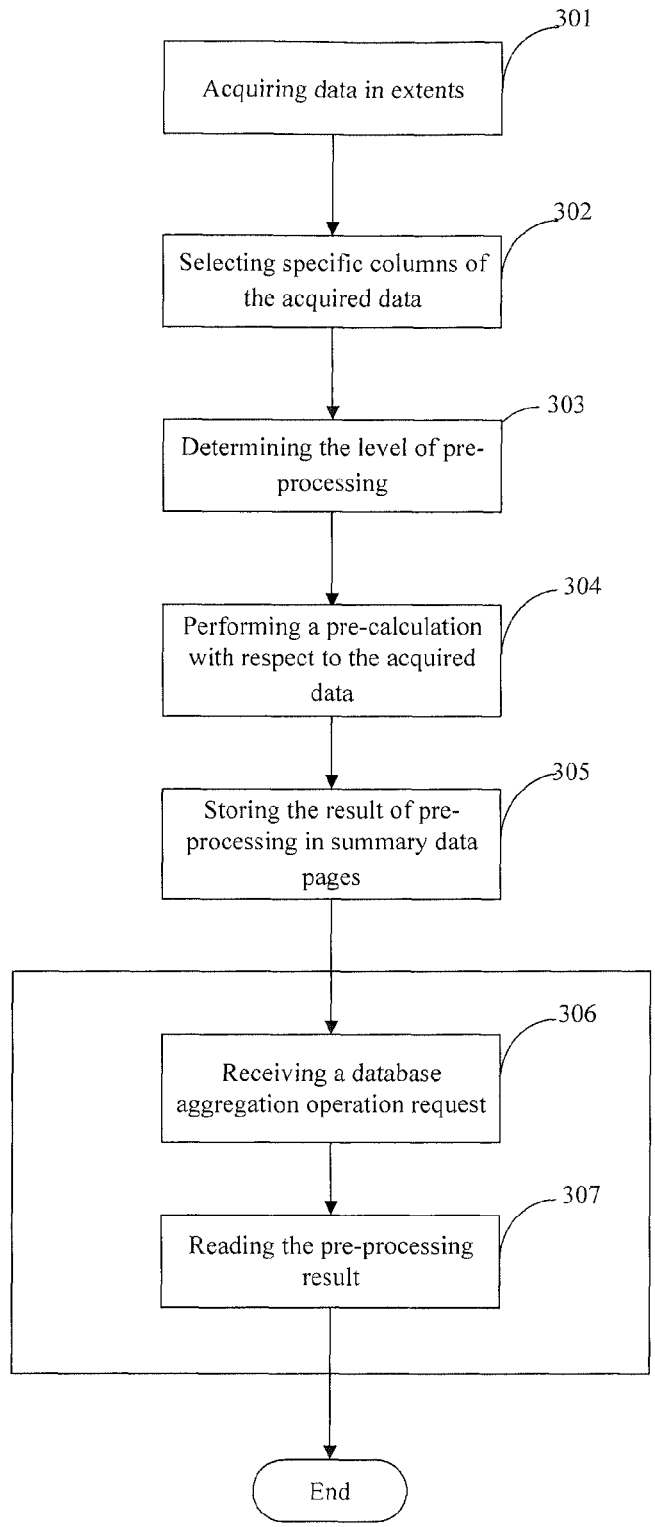
FIG. 3 is a flowchart illustration for processing database aggregation operations in accordance with an alternate embodiment.

FIG. 3 shows a flowchart of data processing method for database aggregation operations according to a further embodiment of the present invention. Steps 301 and 305 in FIG. 3 correspond to steps 201 and 203 in FIG. 2 respectively, descriptions of which are not repeated here. Steps 302 to 304 in FIG. 3 correspond to step 202 in FIG. 2. Steps 306 and 307 in FIG. 3 (within the dotted line block) may be understood as a process of real performance of the database aggregation operation request after data is processed by the method shown in FIG. 2.

In step 302, specific columns of data in said normal data pages are selected. Here, the normal data pages may be normal data pages in an original extent or normal data pages in an index extent (hereinafter, this is also applicable). Specific columns are selected in order to determine which columns of data in normal data pages on earth are to be pre-processed. The method of selecting specific columns depends on different factors, such as application scenarios, industries. For example, suppose in the banking industry, it is less likely to perform database aggregation operations on the column "age of client". Therefore, though the data column "age of client" is of the integer type and database aggregation operations may be performed on it theoretically, from the practical viewpoint, this column is not to be selected as the specific column. In the Table 2 above, "AMOUNT" and "QUANTITY" are selected as two specific columns.

Next, in step 303, the level of said pre-processing is determined. According to one embodiment of the present invention, the level of pre-processing comprises at least one of the extent level, the data page level and the specific key value level. As shown in the Table 2 above, the exemplary pre-processing result is at the "extent level". That is, the pre-processing result contains only pre-processing on the whole extent. Accordingly, the "data page level" means pre-processing is performed on each data page in the extent. The "specific key value level" means pre-processing is performed on a certain or some certain specific key values of data columns in the extent. Here, the "specific key value" means specific values of data columns. For example, in a certain extent, there is one column "age". Then "age=28" is a specific key value. According to one embodiment of the present invention, one pre-processing level may be selected in the alternative. That is, pre-processing is performed at only a certain level. According to one embodiment of the present invention, a plurality of pre-processing levels may be selected at the same time. That is, pre-processing may be performed at the extent level, at the data page level, and at the specific key value level at the same time, the purpose of which is to provide pre-processing results of more levels of granularities so as to adapt to possibilities of various real-time database aggregation operations. For example, suppose that a received real-time database aggregation operation request requires calculating the sum of all data in the second data page and partial data in the third data page in a certain extent, with respect to a specific data column. If pre-processing results are beforehand provided at the data page level, the pre-processing result of the second data page may be directly utilized with respect to all data in the second data page. Only the partial data in the third data page need to be read row by row and calculated.

Next, in step 304, according to selected specific columns and determined pre-processing level, a pre-calculation is performed with respect to data in said normal data pages. Here, the "pre-calculation" means operations such as SUM, AVG, MAX, MIN, etc.

After step 305, FIG. 3 proceeds to step 306. In step 306, a database aggregation operation request is received. From step 306, the process enters a stage of real-time performance of the database aggregation operation request. The database aggregation operation request may be given in the form of a SQL query statement, but may also be given in other ways. Next, in step 307, according the received database aggregation operation request, pre-processing results stored in the summary data pages are read to perform said database aggregation operation request. Those skilled in the art should understand that, after pre-processing is performed on data and pre-processing results are stored in summary data pages, when the database aggregation operation request is performed in real time, it is possible to determine the extents, data pages or specific key values to be accessed according to the database aggregation operation request (often embodied as the SQL query statement), so as to directly read corresponding pre-processing results. Steps 306 and 307 are not necessary steps of the present invention. They are shown in FIG. 3 in order to illustrate the technical effect in the course of practical application after achieving the inventive concept.

It is also noted that steps 302-304 are not necessary steps of the present invention either, because those skilled in the art should understand that pre-processing in step 202 may be performed on default specific columns (e.g., all columns of the integer type or the floating point type) and at default pre-processing levels. Of course, more steps may be inserted into steps 302-304, e.g., setting the type of required calculation which comprises SUM, AVG, MAX, SQUARE, SQRT, etc. In addition, for example, in the case where the levels determined in step 303 contain the specific key value level, a step of determining specific key values may be further included.

Figures 4C, 4D:
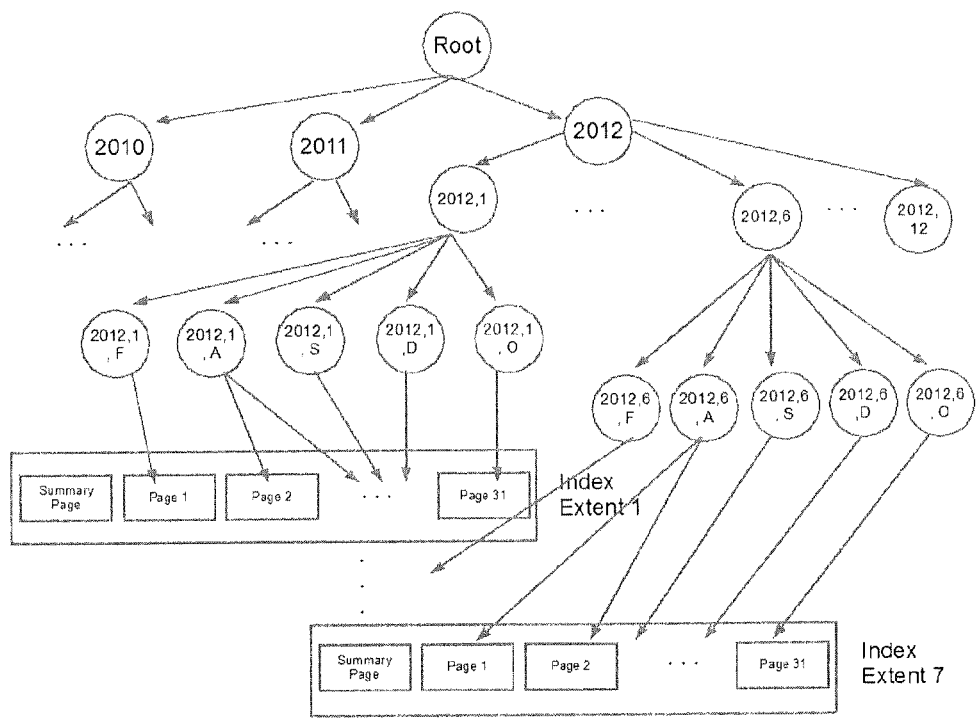

FIGS. 4A to 4F show different views of respective stages of performing pre-processing on data and fulfilling database aggregation operation requests according to one embodiment of the present invention, wherein FIG. 4A shows a definition of an instance database table. The content of the definition is mainly types of respective data columns, in which the floating point type, the string type, the integer type, etc. are included.

FIG. 4B shows the general content of the instance database table. In fact, FIG. 4B has the same content as that in Table 1.

FIG. 4C shows an exemplary statement for creating an index according to the database table of FIG. 4B. As can be seen from the statement in FIG. 4C, it is necessary to create the index with respect to the database table of FIG. 4B according to three columns, that is, YEAR, MONTH, CATEGORY.

FIG. 4D shows an index tree created according to the exemplary statement of FIG. 4C. As can be seen from FIG. 4D, all data with the YEAR of "2012", the MONTH of "1" and the CATEGORY of 5 possible values are stored in data pages 1-31 (page 1-page 31) in the first extent (EXTENT 1). The extent comprises a summary data page for storing pre-processing results of the extent. As shown in FIG. 4D, there are a total of 7 extents, and all of them are index extents. Each extent comprises one summary data page for storing pre-processing results of the extent.

FIG. 4E shows one of summary data pages generated based on the index tree created in FIG. 4D. One of the summary data pages shown in FIG. 4E is the pre-processing result of a certain extent. Respective columns in FIG. 4E are described as follows. The first column is a type column. It is of less meaning for the extent and the page, and it is mainly used to save different key values in order to locate corresponding summary information. The second column is a row number column. It saves the number of records that satisfy the above type. The third column is a sum column. It is used to save the sum of records that satisfy the above type. The fourth column is a maximum value column. It is used to save the maximum value among records that satisfy the above type. The fifth column is a minimum value column. It is used to save the minimum value among records that satisfy the above type. Respective rows in FIG. 4E are described as follows. The first row is summary information of the extent. The second row is summary information of page 1. The third row is summary information of page 2. The fourth row is summary information of page 3. The fifth row is summary information of page 4. The sixth row is summary information of page 5. The seventh row is summary information of all records with the value KEY 1 in corresponding columns in the specific extent. The eighth row is summary information of all records with the value KEY 2 in corresponding columns in the specific extent. The ninth row is summary information of all records with the value KEY 3 in corresponding columns in the specific extent. It is noted that, for the sake of conciseness, summary information of page 6 to page 31 is not shown in FIG. 4E. Therefore, the value 26710 in the third column SUM in FIG. 4E is equal to the sum of all values in the column "AMOUNT" of the five data pages (page 1 to page 5), i.e., 5000+6530+6230+3230+5720. Likewise, those skilled in the art will understand the meanings and sources of values in other columns in FIG. 4E.

As seen from FIG. 4E, pre-processing is performed at three levels. Pre-processing results contain pre-processing results at the extent level, pre-processing results at the data page level, and pre-processing results at the specific key value level.

FIG. 4F shows query return results returned based on a certain database aggregation operation request. The database aggregation operation request is as follows:
SELECT CATEGORY, SUM(AMOUNT), MAX(AMOUNT), MIN(AMOUNT), AVG(QUANTITY) FROM SALES WHERE YEAR=2012 AND MONTH>=1 AND MONTH<=6 GROUP BY CATEGORY The specific database aggregation operation request is a SELECT statement. The general meaning of the SELECT statement is: select data of the first half of year 2012, construct a return result containing CATEGORY, SUM(AMOUNT), MAX(AMOUNT), MIN(AMOUNT), AVG(QUANTITY), and order the return result by CATEGORY. By utilizing the pre-processing result in FIG. 4E, query return result in FIG. 4F can be generated rapidly. Those skilled in the art are able to infer respective specific values in FIG. 4F on the basis of understanding of the inventive concept, description of which is not repeated here.

FIGS. 4A to 4E are only to exemplify the inventive concept and corresponding effects of the present invention. To help clarity and understanding, the data in FIG. 4B is intentionally designed in a certain manner that does not necessarily provide data in a most concise manner. As appreciated by those skilled in the art, however, this is only to aid understanding. Nonetheless, subsequent analysis and examples provided FIGS. 4E and 4F also only provide relevant data (by way of example) to teach and emphasize some of the inventive concepts and their corresponding effects according to one embodiment.

Figure 5:
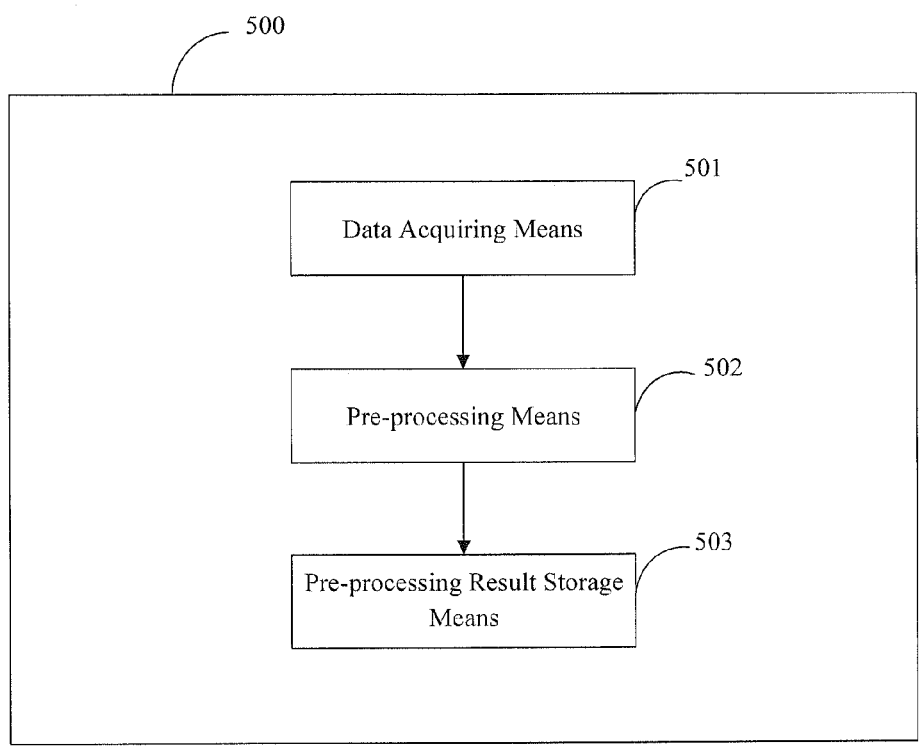
FIG. 5 depicts another embodiment of the present invention for processing aggregation operation.

FIG. 5 shows a block diagram of a data processing system for database aggregation operations according to one embodiment of the present invention. The system shown in FIG. 5 is generally represented by the system 500. Specifically, the system 500 comprises: a data processing means 501 configured to acquire data located in normal data pages of extents; a pre-processing means 502 configured to perform database aggregation operation pre-processing on the acquired data; and a pre-processing result storage means 503 configured to store results of said pre-processing in summary data pages, said summary data pages being used for performing database aggregation operations rapidly. It can be understood that, means 501-503 in the system 500 correspond to steps 201-203 in the method shown in FIG. 2, description of which is not repeated here.

The flowchart and block diagrams in the discussed figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Although the system and method for processing local files by using a remote application of the present invention have been described in detail in combination with specific instances, the present invention is not limited thereto. Those of ordinary skill in the art can make many modifications, substitutions and variations to the present invention under teaching of the present specification without departing from the spirit and scope of the present invention. It will be understood that all such modifications, substitutions and variations still fall within the protection scope of the present invention. The protection scope of the present invention is defined by accompanying claims.

What is claimed is:

1. A data processing method for database aggregation operations performed by a computing device comprising a processor and a memory, comprising:
   acquiring, by the processor from a database, data located in a plurality of normal data pages located in an first index extent of a plurality of extents;
   performing, by the processor, a database aggregation operation pre-processing on the data, the database aggregation operation pre-processing comprising:
      selecting specific columns of the data in the plurality of normal data pages,
      selecting a plurality of pre-processing levels at a same time within the specific columns of the data, wherein the plurality of pre-processing levels includes an extent level, a data page level, and a specific key value level, and
      performing a pre-calculation with respect to the selected specific columns of the data and the plurality of pre-processing levels at the same time to produce a result of database aggregation operation pre-processing;
   storing, by the processor, the result in at least one summary data page on the database, the summary data page configured to enable subsequent database aggregation operations; and
   adding mapping information in the at least one summary data page for linking the at least one summary data page to the extent from which the plurality of normal data pages were acquired.

2. The method according to claim 1, wherein the at least one summary data page and the plurality of normal data pages are located in the extent.

3. The method according to claim 1, wherein the at least one summary data page and the plurality of normal data pages are arranged in different extents.

4. The method according to claim 1, wherein
   the plurality of normal data pages are arranged according to the specific columns in the data and corresponding to the plurality of pre-processing levels.

5. The method according to claim 1, further comprising:
   receiving a database aggregation operation request; and
   reading the result to fulfill the received database aggregation operation request.

6. A data processing system for database aggregation operations, comprising a memory and a processor coupled to the memory, the memory storing program instructions that when executed by the processor cause the processor to provide:

a data acquiring module configured to acquire data located in a plurality of normal data pages located in an first index extent of a plurality of extents;
a pre-processing module configured to perform database aggregation operation pre-processing on the data, the database aggregation operation pre-processing comprising:
- selecting specific columns of the data in the plurality of normal data pages,
- selecting a plurality of pre-processing levels at a same time within the specific columns of the data, wherein the plurality of pre-processing levels includes an extent level, a data page level, and a specific key value level, and
- performing a pre-calculation with respect to the selected specific columns of the data and the plurality of pre-processing levels at the same time to produce a result of database aggregation operation pre-processing; and a pre-processing result storage module configured to store the result in at least one summary data page on the database, the at least one summary data page configured to enable subsequent database aggregation operations;
a mapping information adding module configured to adding mapping information in the summary data pages for linking the summary data pages to the extent in which the data pages are located.

7. The system according to claim 6, wherein the at least one summary data page and the plurality of normal data pages are located in a same extent of the plurality of extents.

8. The system according to claim 6, wherein the at least one summary data page and the plurality of normal data pages are located in different extents of the plurality of extents.

9. The system according to claim 6, wherein the plurality of normal data pages are arranged according to the specific columns in the data and corresponding to the plurality of pre-processing levels.

10. The system according to claim 6, the program instructions further cause the processor to provide:
- a request receiving module configured to receive a database aggregation operation request; and
- a request performing module configured to reading the pre-processing result stored in the summary data pages to perform the received database aggregation operation request.

11. A computer program product for performing database aggregation, the computer program product comprising: a non-transitory computer readable storage medium having program code embodied therewith, the program code executable by a processor to cause the processor to:
acquire data located in a plurality of normal data pages located in at least one extent of a database located in an first index extent of a plurality of extents;
perform a database aggregation operation pre-processing on the data, the database aggregation operation pre-processing comprising:
- selecting specific columns of the data in the plurality of normal data pages,
- selecting a plurality of pre-processing levels at a same time within the specific columns of the data, wherein the plurality of pre-processing levels includes an extent level, a data page level, and a specific key value level, and
- performing a pre-calculation with respect to the selected specific columns of the data and the plurality of pre-processing levels at the same time to produce a result of database aggregation operation pre-processing;

store the result in at least one summary data page, the at least one summary data page, the summary data page configured to enable subsequent database aggregation operations;
add mapping information in the at least one summary data page for linking the at least one summary data page to the extent from which the plurality of normal data pages were acquired.

* * * * *